Patented Apr. 10, 1923.

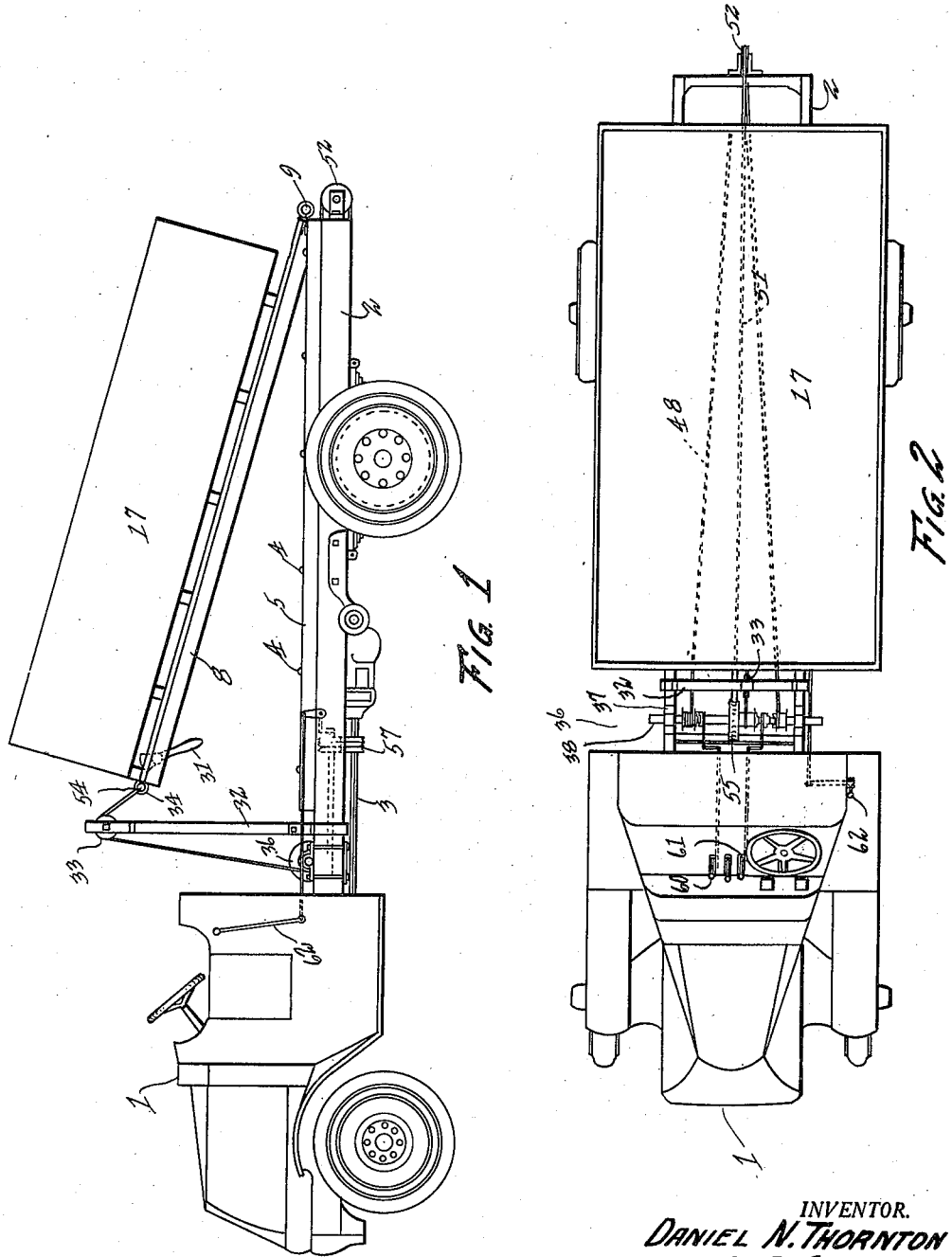

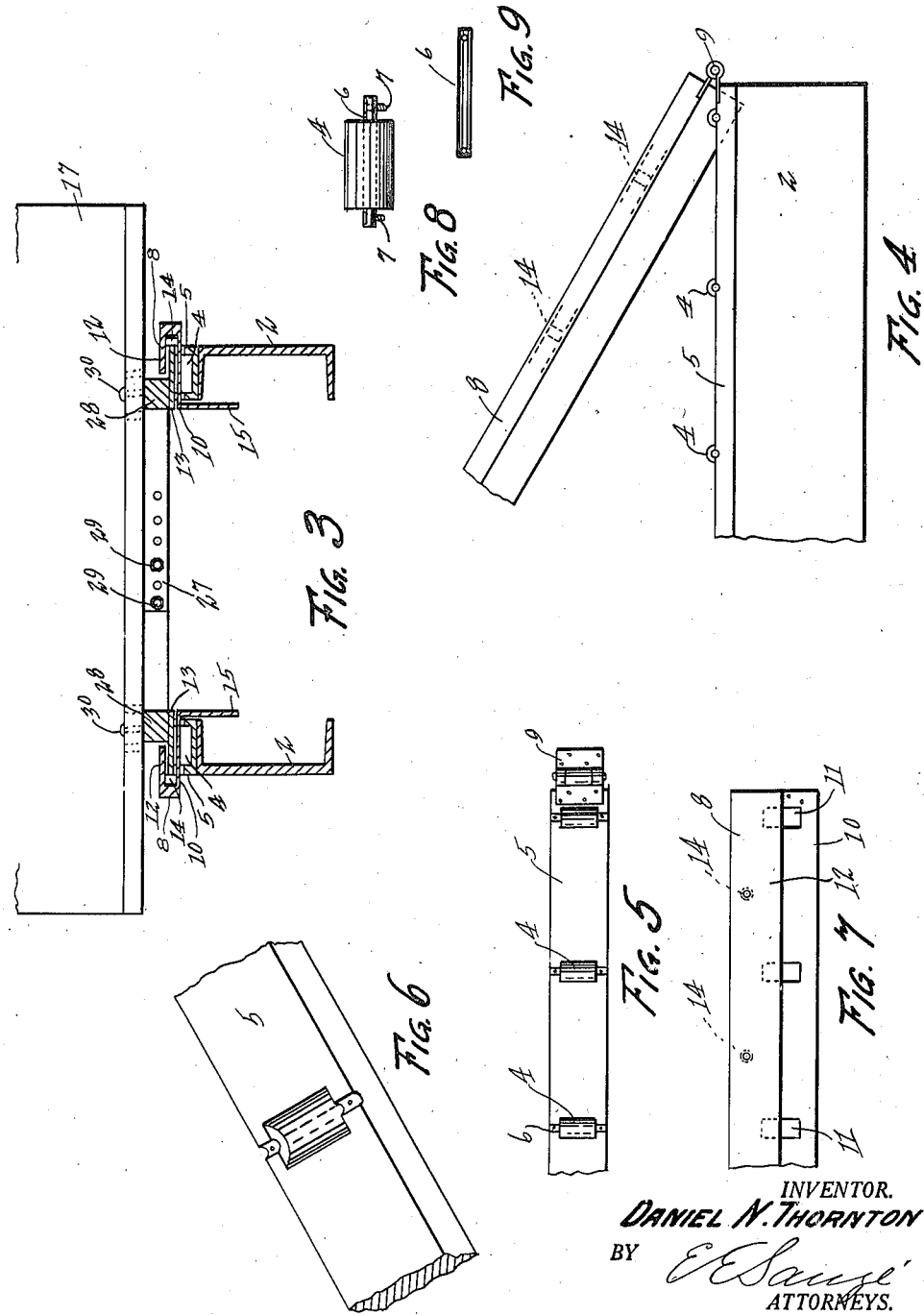

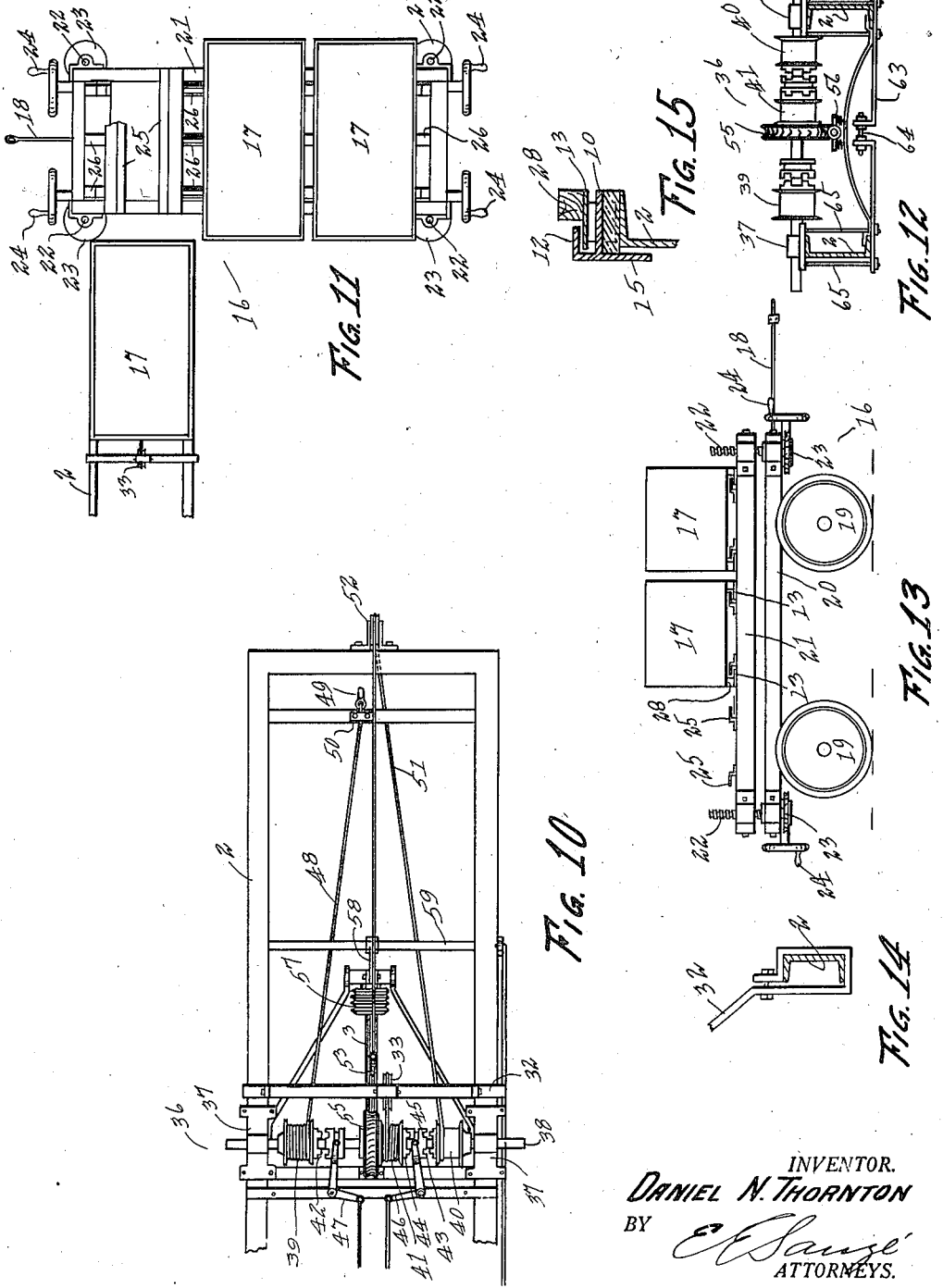

1,451,127

UNITED STATES PATENT OFFICE.

DANIEL N. THORNTON, OF WAITSBURG, WASHINGTON.

TRUCK AND TRAILER CARRIER.

Application filed December 17, 1921. Serial No. 523,173.

*To all whom it may concern:*

Be it known that I, DANIEL N. THORNTON, a citizen of the United States, residing at Waitsburg, in the county of Walla Walla and State of Washington, have invented certain new and useful Improvements in Trucks and Trailer Carriers, of which the following is a specification.

This invention relates to detachable bed trucks and trailer carriers and has as one of its objects to provide a mechanism that is simple in design, that may be easily attached to the frame of a truck and whereby the truck bed may be easily dumped or removed.

A further object of the invention is to provide a means whereby a plurality of beds may be used successively both for loading and transportation purposes.

With these and other objects in view reference is now had to the accompanying drawings in which—

Fig. 1 is a side elevation of a truck with bed raised in the dumping position;

Fig. 2 is a plan view of a truck showing operating mechanism;

Fig. 3 is a sectional view of frame showing position of rollers;

Fig. 4 is a partial side elevation of frame showing position of rollers;

Fig. 5 is a plan view of roller plate;

Fig. 6 is a perspective view of part of roller plate;

Fig. 7 is a plan view of slide plate;

Fig. 8 is a side elevation of horizontal roller;

Fig. 9 is a side elevation of roller pin;

Fig. 10 is a plan view of part of frame and the operating mechanism;

Fig. 11 is a plan view of part of frame and carrier;

Fig. 12 is a rear elevation of operating mechanism;

Fig. 13 is a side elevation of carrier;

Fig. 14 is a rear elevation of part of dumping standard; and

Fig. 15 shows a modified form of guide member in section.

Having reference to the drawings like numerals refer to like parts throughout the several views and the numeral 1 refers to a truck of the usual gasoline propelled type, with the frame 2 extended rearwardly in the usual manner, and driven by means of the usual propeller shaft 3 positioned below the level of the frame.

Secured to the frame in any suitable manner are rollers 4 which form a track by being either directly secured to the frame or by means of plates 5 which contain the rollers and combinedly form a track; a track of this description obviously may be attached to any frame regardless of its width. The rollers are loosely mounted on the pin 6 which is secured to the plate or frame by means of countersunk screws 7 provided for the purpose.

Guide members 8 are attached to the track by means of a hinge 9 and consist of a plate 10 in which are positioned orifices 11 registerable with the rollers 4 in a manner that the guide plate may seat completely on the track without interfering with the roller; above this plate is a second plate 12 and the two combined form a guide way for the flange 13 to slide therein.

Between these two last mentioned plates and positioned vertically are rollers 14, as shown in Figs. 3, 4 and 7; these, however, may be omitted if desired, this form being shown in Fig. 15, which also shows a modified form of guide member in which a guide plate 15 is attached to the outside of the above mentioned plates instead of on the inside as shown in Fig. 3. In both cases the guide plate registers with the side of the frame to prevent lateral motion of the guide members.

Separable from the truck is a trailer carrier 16 so called as it is intended for the double purpose of a trailer and as a carrier (or platform) for the boxes 17. As a trailer any suitable means 18 may be used to attach the trailer to the truck and as means of this class are old in the art they will not be described.

The trailer carrier consists of wheels 19, a body frame 20 suitably mounted on the wheels, a carrier frame 21, and adjusting and leveling mechanism for the vertical movement of the carrier frame consisting of screws 22 operable by means of worms and gears 23 and the handles 24 by which the adjusting and leveling may be manually accomplished. Guide members 25 which correspond to the track on the truck in width, are attached to the carrier frame in a lateral position, and rollers 26 act in conjunction therewith to provide an easy movement of the box 17 when sliding it onto or off the trailer carrier.

As the width of truck frames vary, an adjusting means is provided for the flanges 13 whereby they may be adapted to any width of track, the track obviously conforming to the frame of the truck and without adjustment. This adjusting means consists of a split cross member 27 attached to the sills 28, with bolts 29 arranged therein to make the member secure; other bolts 30 are also utilized in the usual manner to secure the sills to the box 17.

As the box is slidably mounted in the guides and as the guides will be raised at one end for dumping purposes, a means for locking the box against accidental longitudinal movement is provided in the pivotally swung and weighted block 31 which is attached to the guide members in any suitable manner and which may be of any suitable shape to accomplish the purpose.

On the truck frame and extended upward is a dumping standard 32 carrying a pulley 33, and attached to the forward end of the guide members is a ring 34 in which is fastened a cable 35, the cable in turn passing over the pulley to the operating mechanism 36 which will now be explained.

The operating mechanism is attached to the frame 2 by journal boxes 37 which support rotatably the shaft 38. On the shaft are operably mounted cable drums 39, 40 and 41 respectively with corresponding clutches 42, 43 and 44. The clutches 43 and 44 have a single sliding member 45 and are operated by the one lever 46 with a similar lever 47 used to operate the drum 39. From the drum 39 a cable 48 extends to the rear of the frame and terminates in a hook 49 after passing through guide pulleys 50 centrally positioned in the frame. Another cable 51 extends rearward and passing over a pulley 52 at the rear of the frame returns toward the forward end where it also terminates in a hook 53. From the drum 41 a third cable extends to pass over the pulley 33 finally also terminating in a hook 54. A ring 34 and other similar rings (not shown) are suitably positioned on the under side of the box to receive the above mentioned hooks and by this means, together with the cables, the box is moved either from the truck or onto the truck or the box may be raised for dumping purposes.

The shaft 38 is also provided with a worm gear 55 which is engaged by the worm 56 which, in turn, is driven by the friction gears 57, one part of which is attached to the propeller shaft 3. A lever 58 is attached to a shaft 59 and to the upper portion of the friction gear and is the means by which the two friction gears are brought into or out of play; this action and that of bringing the drums into operation being accomplished in the usual manner by the operating levers 60, 61 and 62 which are conveniently disposed in and about the cab of the truck.

Now, by operating the lever 62 the friction gears may be engaged and, with the engine running, this engagement will rotate the shaft 38, then if dumping is desired the lever 61 is thrown to engage the drum 41 which, with the hook 54 engaging the ring 34, now raises the box 17 and thus dumps the contents.

Suppose, now, that the work to be done is hauling wheat from a storage tank in the field to an elevator at some distance away; the trailer carrier will be loaded with, say, three boxes when the truck will couple onto the trailer carrier and transport it to the storage tank; one of the boxes will now be filled, the truck backs up to the filled box, and after adjusting the box to a height corresponding to the height of the truck track, the hook 49 suitably engages the end of the box (or the above mentioned ring, not shown) and the lever 60 is then operated to engage the drum 39 which rotating under power from the propeller shaft draws the box onto the truck. The truck now transports this box to the elevator where it is dumped as above explained. In the meantime the other boxes left on the trailer carrier are being filled and upon the return of the truck the empty box is removed by the cable 51 and drum 40, the hook 53 in this case engaging the opposite end of the box, and the filled box is then substituted and the operation repeated.

As the trailer carriers and empty boxes are light two may be attached to the truck and in use one trailer carrier will be left at each end of the line to be used as above mentioned.

In Fig. 12 a brace member 63 is shown with lock nuts and bolt 64 wherewith to tighten it against the frame without boring holes in the frame. In this Figure it will also be noted that the journal boxes 37 are fastened to the frame by the bolts 65 which also do not pass through the frame. This scheme of fastening to the frame is carried out throughout as far as practical and thus a means of the class described may be attached to nearly any truck.

The shaft 38 may be extended to accommodate a winch on either or both ends if desired.

Having thus described my invention, I claim—

1. In a truck and trailer carrier, in combination, a track, rigidly attached to the frame of a truck, guide members hingeably attached to said track, a trailer carrier separable from said truck, guide members rigidly attached to said trailer carrier, a box flanges adjustably attached to the bottom of said box and positioned to register with either of said guide members, and operating means attached to said frame, and operable by means of the propeller shaft of said truck, for dumping said box and for moving said box from the truck to the trailer carrier and vice versa.

2. In a truck and trailer carrier, a frame, rollers attached to said frame, and forming therewith a track, guide members hingeably attached to said frame, a trailer carrier separable from said truck and provided with laterally disposed guide members, and further provided with means for adjusting said carrier as to height; a box, slidably and removably mounted on said truck, flanges adjustably attached to the bottom of said box, means for locking said box against accidental longitudinal movement, a dumping standard attached to said frame carrying a pulley, operating means attached to said frame consisting of a laterally disposed shaft, cable drums operably mounted on said shaft, means for operating said shaft from the propeller shaft of said truck, means to independently operate said drums with said shaft, and cable means detachably attached to said box and operably attached to said drums, with one of said cable means passing over said pulley.

3. In a truck and trailer carrier, a frame, a track attached to said frame and provided with rollers, guide members hingeably attached to said frame and provided with orifices registerable with said rollers, a trailer carrier separable from said truck, said carrier provided with laterally disposed guide members, rollers disposed in the path of said guide members, and means to adjust said carrier as to height, a box slidably and removably mounted on said truck, flanges adjustably attached to the bottom of said box, means for locking said box against accidental longitudinal movement, a dumping standard attached to said frame and carrying a pulley, and an operating means attached to said frame consisting of a laterally disposed shaft, cable drums operably mounted on said shaft, a worm gear mounted on said shaft, a worm operably connected at one end with said worm gear and carrying at its other end a friction gear, a corresponding friction gear mounted on the propeller shaft of said truck, and operating levers for operating said cable drums and said friction gears, and cable means detachably attached to said box and operably attached to said drums.

4. In a truck and trailer carrier, a frame, a roller track, on said frame, or orificed guide members hingeably attached to said track and provided with vertical guide rollers, and further provided with a guide plate positioned registerably with said frame, a trailer carrier separable from said truck, a body frame on said carrier, a carrier frame adjustably mounted above said body frame, guide members provided with roller bearings attached to said carrier frame and positioned laterally thereof, a box slidably and removably mounted on said truck, and provided with adjustable flanges, and an operating means attached to said frame and operable from the propeller shaft of said truck, said means operable to dump said box, and to draw said box onto said truck, and from said truck onto said trailer carrier.

5. In a truck and trailer carrier, a frame, a roller track rigidly attached to said frame, guide members hingeably attached to said track, a trailer carrier separable from said truck and provided with a body frame, a carrier frame, worm and worm gear attached to said body and said carrier frames for vertical adjustment thereof, means to manually operate said gear, and roller guide members attached to and positioned laterally on said carrier frame, a box slidably and removably mounted on said truck, and an operating means attached to said truck and operable from the propeller shaft of said truck, said means operable to dump said box, and to draw said box onto said truck and from said truck onto said trailer carrier.

In testimony whereof I affix my signature.

DANIEL N. THORNTON.